United States Patent [19]

Ogata

[11] Patent Number: 4,614,976
[45] Date of Patent: Sep. 30, 1986

[54] DOCUMENT READER

[75] Inventor: Minoru Ogata, Yokohama, Japan

[73] Assignee: Canon Kabushiki Kaisha, Tokyo, Japan

[21] Appl. No.: 666,652

[22] Filed: Oct. 31, 1984

[30] Foreign Application Priority Data

Nov. 4, 1983 [JP] Japan .............................. 58-205843
Nov. 21, 1983 [JP] Japan .............................. 58-217766

[51] Int. Cl.$^4$ .......................................... H04N 1/32
[52] U.S. Cl. .................................. 358/257; 358/284; 358/293
[58] Field of Search ............... 358/257, 280, 284, 293, 358/294, 286

[56] References Cited

U.S. PATENT DOCUMENTS 3,872,242  3/1975  Cooley ................................ 358/286
4,087,838  5/1978  Masaki et al. ..................... 358/286 X
4,220,978  9/1980  Rhyins et al. ........................ 358/293

Primary Examiner—Randall L. Green
Attorney, Agent, or Firm—Fitzpatrick, Cella, Harper & Scinto

[57] ABSTRACT

A reference light from a reference reflective surface is projected onto an image sensor to form an output signal from the image sensor corresponding to the distribution of a reference light. This output signal is stored in a memory as a reference signal used for shading correction. An output signal from the image sensor corresponding to a document image is corrected in accordance with the reference signal. Irrespectively of whether or not the document is being read, the image sensor is irradiated by the reference light at a predetermined point of time to renew the reference signal.

8 Claims, 6 Drawing Figures

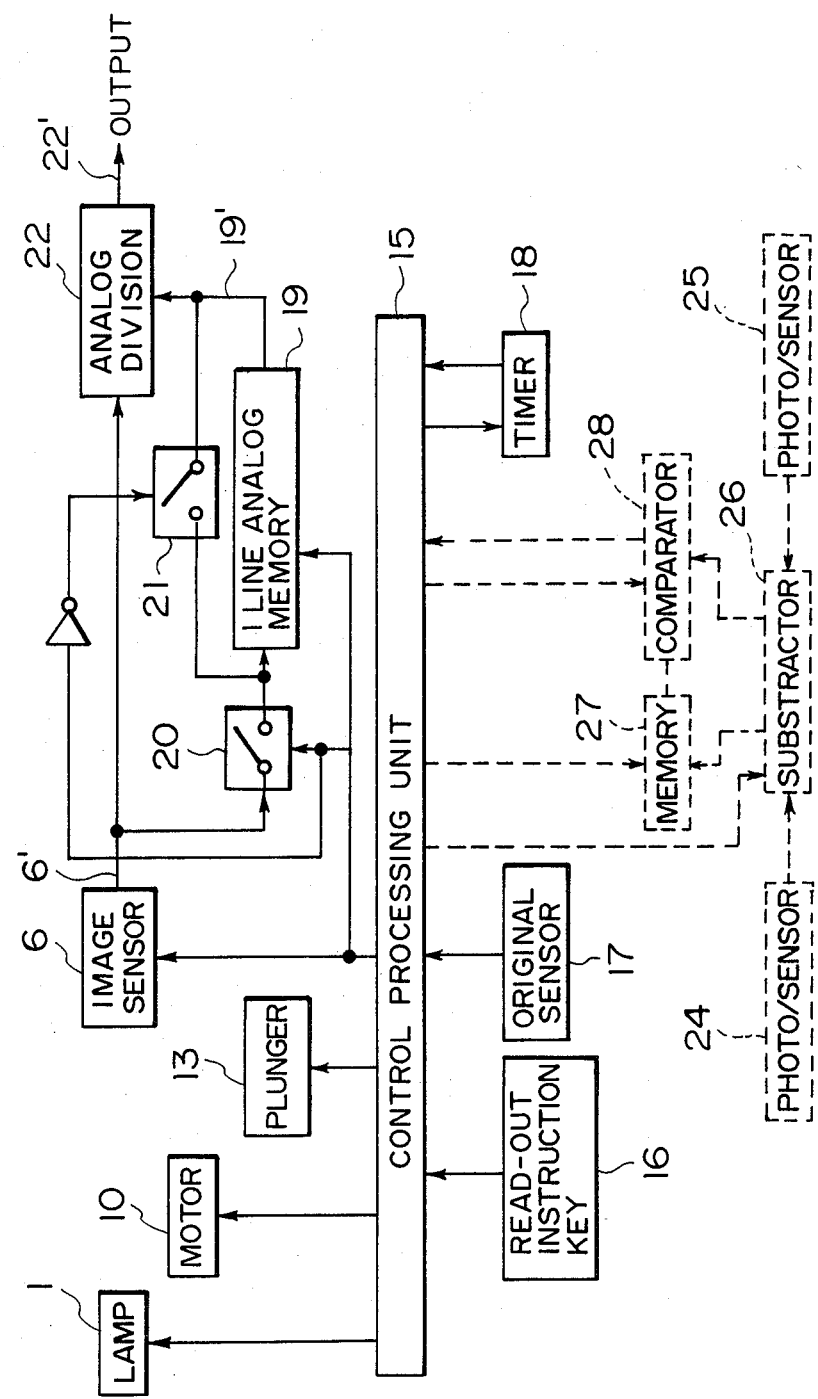
F I G. 2

DOCUMENT READER

BACKGROUND OF THE INVENTION

1. Field of the Invention

The present invention relates to a document reader suitable for use in facsimiles, copying machines, information storage systems and others, that is, to an apparatus for converting the image of a document into electric signals.

2. Description of the Prior Art

In the general document readers, a document to be read is irradiated by a lamp to form an image which in turn is projected onto a solid state image sensor such as charge coupled device (CCD) and the like through an imaging optical system. The illumination light from the lamp may be irregular with respect to light distribution on the document. Furthermore, the imaging optical system is placed under the influence of the so-called Cosine$^4$ Law that as the angle included between the incident light and the optical axis increases, the amount of light passing through the optical system decreases. Due to such various factors, the light distribution in the image formed on the image sensor is generally irregular rather than being uniform. Such an irregularity of the light distribution will be called "shading".

There is known the shading correction in which output signals from the image sensor are corrected in accordance with the shading to form image signals with no influence from the shading. In the conventional shading correction systems, a reflective plate is disposed as a backward plate at the document reading position in which part of the document is to be projected onto the image sensor through the imaging optical system. Before that part of the document reaches this reading position, the reflective plate is irradiated by the light from the lamp to form a reference light reflected by the reflective plate, which reference light is then projected onto the image sensor through the imaging optical system. The resulting output signal from the image sensor is stored in a memory as a reference shading signal. When the document subsequently reaches the document reading position with the image thereof being projected onto the image sensor, the latter generates an electrical signal corresponding to the brightness of the document image formed on the image sensor. This electric signal is then corrected in accordance with the reference shading signal previously stored in the memory. For example, the signal corresponding to the document image is divided by the reference shading signal in a divider circuit. A signal thus obtained from such a correction circuit has no influence from shading.

The shading waveform may be changed to a different one between a point wherein the shading waveform is stored in the memory and another point wherein the signal corresponding to the document image is actually being corrected. If such a difference is too large, a signal obtained from the shading correction will not agree with the part of the document to be read.

To overcome such a problem, the prior art has proposed that a period of time between a point wherein the reference shading signal is stored in the memory and another point wherein a sheet of document has completely been read, that is, wherein the shading correction for a sheet of document has been completed is reduced as little as possible. In transmitters such as facsimiles and others, however, the speed in reading a document highly depends on speeds of its opposite transmitter and line. Thus, a substantial time period may be required to completely read a sheet of document. This is true of the case where a document having an increased length is to be read.

When an increased period of time is required to complete the reading of the document, the aforementioned difference may be increased to form image signals which do not satisfactorily correspond to the document.

When a fluorescent lamp is used as the irradiating lamp and if the ambient temperature is about 0° C., the shading waveform will widely be changed immediately after the system has been started. To overcome this problem, it is required to maintain the fluorescent lamp at its predetermined range of temperature.

SUMMARY OF THE INVENTION

It is therefore an object of the present invention to provide a document reading apparatus which can form image signals well agreeing with a document even if a prolonged time period is required until the reading of the document is completed.

Another object of the present invention is to provide a document reading apparatus which can form image signals well agreeing with a document even if the shading waveform is widely changed.

The other objects and features of the present invention will be apparent from the following description.

BRIEF DESCRIPTION OF THE DRAWINGS

FIG. 2 illustrates a control system used in the embodiment of the present invention.

DESCRIPTION OF THE PREFERRED EMBODIMENTS

Figure 1:
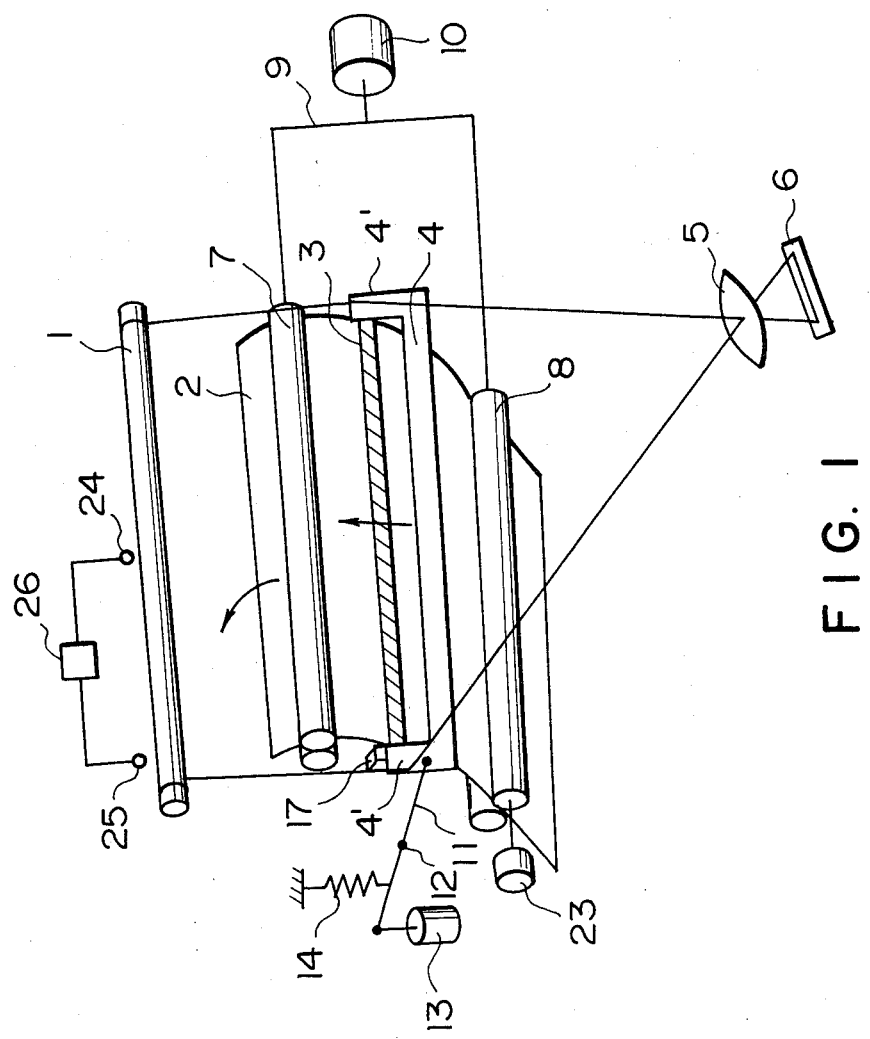
FIG. 1 illustrates an embodiment of the present invention.

In FIG. 1, a document to be read 2 is conveyed by pairs of rollers 7 and 8. Although be not shown in the drawings, guide means for the document is disposed along the path on which the document is moved. The roller pairs 7 and 8 may be driven by a motor 10 through power transmitting means 9 such as gearing or the like. In a document reading position 3, the document 2 is irradiated by a lamp 1 such as a fluorescent lamp or the like. Part of the document placed in the position 3 will be imaged on an image sensor 6 such as CCD or the like through a lens 5.

The image sensor 6 includes a plurality of photoelectric conversion elements arranged as a linear row in the primary scanning direction substantially perpendicular to the secondary scanning direction which corresponds to the direction of document movement. Thus, the image sensor 6 functions to electrically scan the light image line by line in the primary scanning direction. The image sensor 6 generates electric time-constant signals corresponding to the density or brightness of the image formed on the image sensor 6. Output signals from the image sensor 6 are corrected in accordance with the shading as will be described hereinafter.

A reference reflective plate 4 is movably provided which supports an arm 11 swingable about a shaft 12. The arm 11 is connected with an electromagnetic plunger 13 and a tension spring 14. If the electromagnetic plunger 13 is de-energized, the reflective plate 4 is placed at a position out of the optical path between the document reading position 3 and the image sensor 6, that is, the illustrated position under the influence of the spring 4. If the plunger 13 is energized, it moves the reflective plate 4 against the force of the spring 14 in the direction of arrow to a position immediately forward of the document reading position 3. In other words, the reflective plate 4 will be inserted into the optical path between the document reading position 3 and the image sensor 6. In such a position, the reflective plate 4 will be inserted in front of the document 2 even if the latter is placed at the document reading position 3. Therefore, the document 2 is hidden from the sensor 6 by the reflective plate 4.

When the reflective plate 4 is inserted into the above optical path, it reflects the light from the lamp to the lens 5 through which the light passes to irradiate the image sensor as a reference light. The distribution of the reference light on the image sensor 6 depends on the distribution of luminous strength in the lamp 6, the characteristic of the lens 5 and others. In other words, there is produced a shading in the distribution of the reference light on the image sensor 6. Thus, the image sensor 6 generates a signal corresponding to this distribution of the reference light, this signal being then stored in the memory. Subsequently, the electromagnetic plunger 13 is de-energized to return the reflective plate 4 to the illustrated position, that is, the position out of said optical path. Preferably, the reflective plate 4 has a uniform reflectance through the entire surface. For example, the reflective plate 4 may be white-colored or satinized through-out the surface thereof.

If the document 2 is in the reading position 3 and when the reflective plate 4 is inserted into the position in the optical path, that is, the operative position, the motor 10 is de-energized to stop the movement of the document before the plunger 13 is energized. After the plunger 13 has been deenergized, that is, after the reflective plate 4 has been retracted to the position out of the optical path (inoperative position), the motor 10 is de-energized to re-start the movement of the document. In other words, the reading of the document is re-started.

FIG. 2 illustrates a control system suitable for use in the reader according to the present invention. The control system comprises a central processing unit 15, for example, a microcomputer. The central processing unit 15 receives signals from a reading command key 16 closed by an operator when it is desired to actuate the apparatus, a document sensor 17 such as a microswitch adapted to detect whether or not the document 2 is in the document reading position, and a timer 18. On the other hand, the central processing unit 15 generates, at its output, signals for controlling the lamp 1, motor 10 and plunger 13, signals for controlling the image sensor 6, signals for controlling a one-line analog memory 19, signals for controlling switches 20 and 21, and signals for controlling the timer 18.

The one-line analog memory 19 stores the output of the image sensor 6 corresponding to said reference light, that is, reference shading signal. Upon reading, the output signal 6' of the image sensor 6 corresponding to the image of document and the above reference shading signal 19' outputted from the memory 19 are applied to an analog divider 22 which performs the same signal processing as obtained when the signal 6' is multiplied by the inverse number of the signal 19'. Namely, the signal 6' is corrected in accordance with the signal 19'. Thus, the output 22' from the analog divider 22 corresponds exactly to the document without influence of the shading. This output 22' is converted into a digital signal through an A/D converter. The digital signal is transmitted to an image reproducing device such as electrophotographic printers, ink-jet type printers, thermal-head type printers and the like, or an information storing system and others in which a magnetic or photomagnetic disc is used. Alternatively, the signal 22' may be transmitted directly to the image reproducing device or information storing system without the A/D converter.

Figure 3:
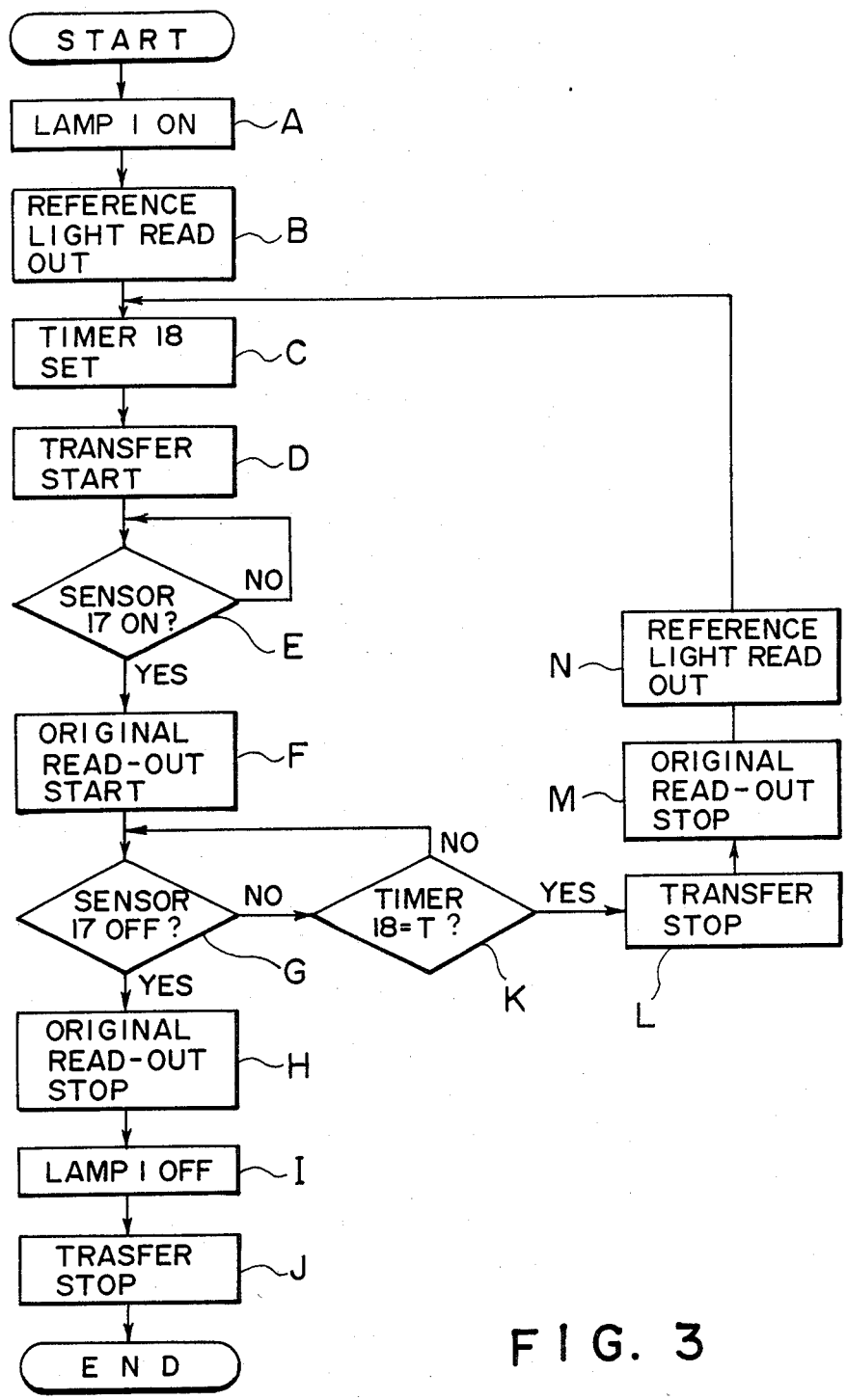
FIG. 3 is a flow chart illustrating the operation of the control system shown in FIG. 2, and FIGS. 4, 5 and 6 illustrate other embodiments of the present invention.

FIG. 3 shows the primary flow chart of the basic operation of the control system. When the command key 16 is closed, the system is first started. At Step A, the lamp 1 is lighted on. Subsequently, the reference light is read at Step B. More particularly, at Step B, the plunger 13 is first energized to insert the reflective plate 4 into said optical path. The image sensor 6 is then driven while at the same time the switch 20 is closed and the switch 21 is opened. Consequently, the aforementioned reference shading signal is stored in the memory 19. Subsequently, the switch 20 is opened and the switch 21 is closed. At the same time, the image sensor 6 is de-energized while the plunger 13 also is de-energized to retract the reflective plate 4 to its position out of the optical path. On the other hand, at Step C, the timer 18 is set for a predetermined time T at the same time as the storage of the reference signal in the memory 19 is completed. At Step D, the motor 10 is simultaneously energized to re-start the movement of the document.

At Step E, the document detection sensor 17 checks whether or not the document is in the reading position 3. When the document reaches the position 3 under the action of the roller pair 8, it is detected by the sensor 17. The reading of the document is immediately started at Step F. More particularly, the image sensor 6 is driven while at the same time the memory 19 also is driven. Thus, the signals 6' and 19' are applied to the divider 22 wherein the signal 6' is corrected in accordance with the signal 19'. The predetermined time T set in the timer 18 may be longer than the time period from when the roller pair 18 is energized to start the movement of the document to when the leading edge of the document reaches the reading position.

Now, at Step G, the sensor 17 checkes whether or not the trailing edge of the document 2 has passed through the reading position 3. If so, the sensor 17 is de-energized. Immediately, at Step H, the reading of the document is stopped. In other words, the image sensor 6 is de-energized while at the same time the application of the signal from the memory 19 to the divider 22 also is stopped.

When the operation is terminated at Step H, the lamp 1 is lighted off at Step I. Subsequently, when the trailing edge of the document 2 has passed through the roller pair 7, the motor 10 is stopped. Thus, the system remains inoperative until it receives the next start signal.

Where at Step G, it is confirmed by the sensor 17 that the document is in the reading position 3, it is discriminated at Step K whether or not the time T has elapsed from when it is set in the timer 18 at Step C. If not so, the Step G is re-executed.

If it is discriminated at Step K that the time T has elapsed, the motor 10 is de-energized to once stop the movement of the document. At Step M, the reading of the document is immediately stopped. In other words, the image sensor 6 is de-energized and the application of the signal from the memory 19 to the divider 22 also is stopped. Thereafter, at Step N, the plunger 13 is energized to irradiate the sensor 6 with the reference light. The resulting output of the sensor 6 (reference shading signal) is stored in the memory 19. Namely, the same operation as that of the Step B is executed at Step N. Subsequently, various operations starting from the Step C are repeated. At this time, the document 2 is in the reading position. Therefore, the reflective plate 4 is inserted in front of the document as described hereinbefore. When the movement of the document is re-started at Step O, the Step F is immediately re-started since the sensor 17 has already been energized.

Time to be set in the timer 18 may manually be changed by the operator depending on various factors such as ambient temperature and others which tend to widely change the shading.

Although the aforementioned embodiment of the present invention has utilized the timer 18, it may be replaced by any other means which can detect the movement of the document and generate a signal when the detected movement of the document reaches a predetermined value. Such a means includes a rotation detector 23 connected with the roller pair 8. In this case, it is discriminated by the detector 23 at Step K in FIG. 3 whether or not the detected rotation of the roller pair 8 (corresponding to the movement of the document) reaches a predetermined value.

The timer 18 and detector 23 may further be replaced by the following means. Referring to FIG. 1, such a means comprises photosensors 24 and 25 for forming electric signals corresponding the amount of light received by these photosensors, such as solar cells, cadmium sulphide cells or the like. The sensors 24 and 25 are adapted to receive light from the central and marginal portions of the lamp 1, respectively. Outputs from the sensors 24 and 25 are then applied to a subtracter 26 for generating a signal corresponding to the difference between the outputs of the sensors 24 and 25. Said central processing unit 15 controls the subtracter 26 and also controls a memory 27 and comparator 28. Signal from the comparator 28 is applied to the central processing unit 15. Output from the subtracter 26 is applied to the memory 27 which stores a signal corresponding to the difference between the outputs of the sensors 24 and 25, that is, the difference between the luminous strengths in the central and marginal portions of the lamp 1. On the other hand, the comparator 28 compares said difference signal stored in the memory 27 with the signal corresponding to the difference between the luminous strengths in the central and marginal portions of the lamp 1. If the difference between these two signals exceeds a predetermined value, that is, if the distribution of luminous strength in the lamp 1 is changed out of an acceptable range when said difference signal is stored in the memory 27, the comparator 28 generates a reference light reading command signal. Where such a means for detecting the distribution of luminous strength in the lamp is used, the subtracter 26 is actuated at Step C in FIG. 3 so that said difference signal produced when the reference shading signal is stored in the memory 19 is stored in the memory 27. At Step F in FIG. 3, the aforementioned document reading operation is started while at the same time the subtracter and comparator 26, 28 also are started. At Step K, it is discriminated whether or not the comparator 28 has generated said reference light reading command signal. If so, various operations starting from Step L are sequentially executed.

Although the just above-mentioned embodiment has been described to have the sensors 24 and 25 adapted to receive light from the central and marginal portions of the lamp 1, these sensors may be disposed to receive light from the other portions of the lamp 1 if information from the lamp with respect to its distribution of luminous strength can desirably be detected. The number of the photosensors used is not limited to two and may be increased to three or more. Furthermore, a plurality of photosensors may be disposed in positions adjacent to the document reading position and which can receive light from the lamp 1. In such a case, the photosensors are located in a line along the direction perpendicular to the movement of document, preferably the primary scanning direction. In any event, it is desirable that the photosensors are so arranged as to block the irradiation light from the lamp 1 to part of the document placed on the reading position 3 and also to obstruct the projection of the document image onto the image sensor 6.

Turning to FIG. 1, the reflective plate 4 has the opposite ends 4' protruding laterally therefrom. When the reflective plate 4 is in the position shown in FIG. 1, these protruding ends 4' is positioned at the opposite sides of the document reading position 3. When the document is being read, the protruding ends 4' also are naturally irradiated by the lamp 1. Light reflected by the protruding ends 4' of the reflective plate 4 are then incident on the image sensor 6 through the lens 5. Thus, the sensor 6 therefore forms signals corresponding to the light from the protruding ends 4', which signals are in turn utilized to correct the gain in the signal formed by the sensor 6 in accordance with the document image.

Figure 4:
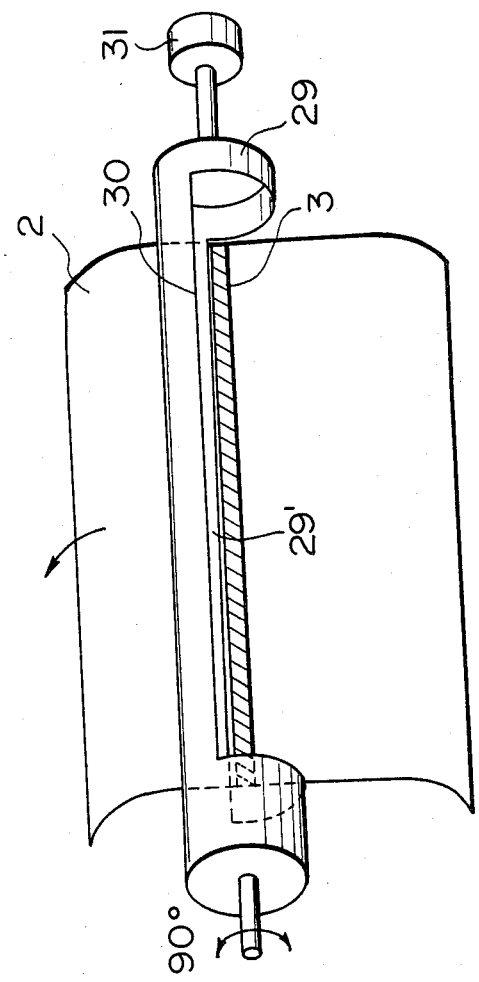

The reference reflective plate 4 shown in FIG. 1 may be replaced by a reference reflective plate 29 as shown in FIG. 4. The reflective plate 29 is in the form of a cylinder partially cut as shown by 30. The internal periphery 29' thereof is utilized as a reference reflective surface. The reflective plate 29 is in the illustrated position when the document is being read. When it is wanted to irradiate the image sensor 6 with a reference light, the cylinder 29 is rotated by a rotary solenoid 31 through 90 degrees. Thus, the internal periphery 29' of the cylinder 29 will be inserted in front of the document placed at the document reading position 3 and then reflect light from the lamp 1 to the image sensor 6 which is irradiated by this reflected light.

Figure 5:
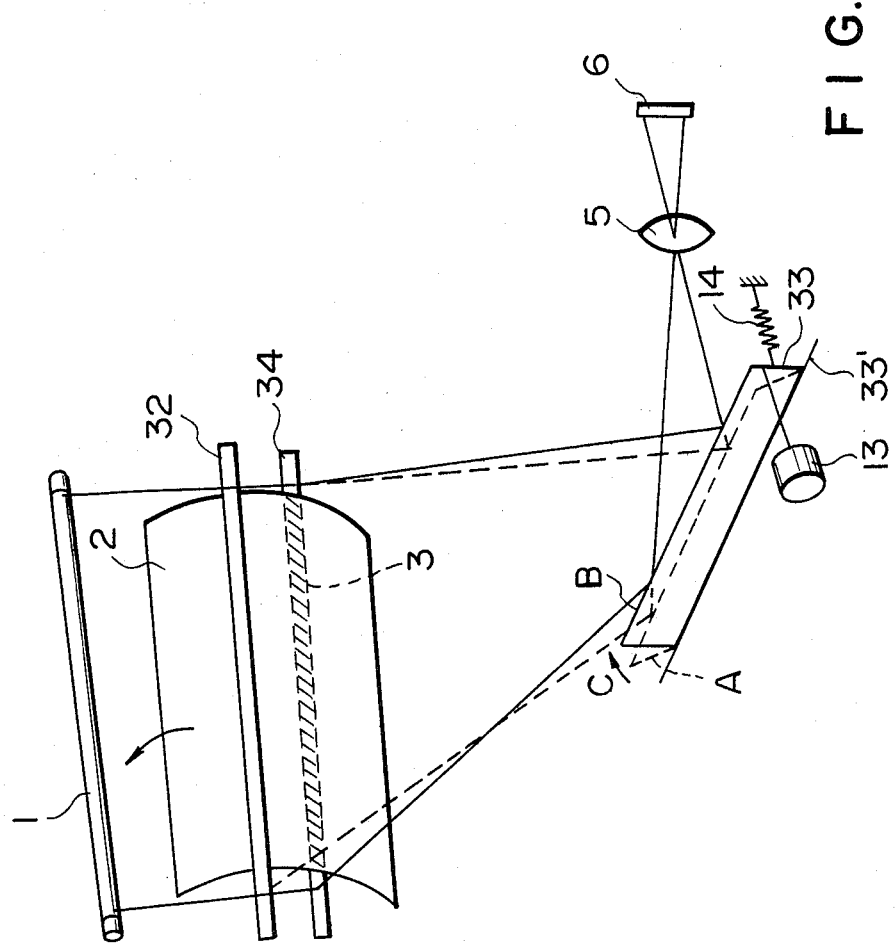
Figure 6:
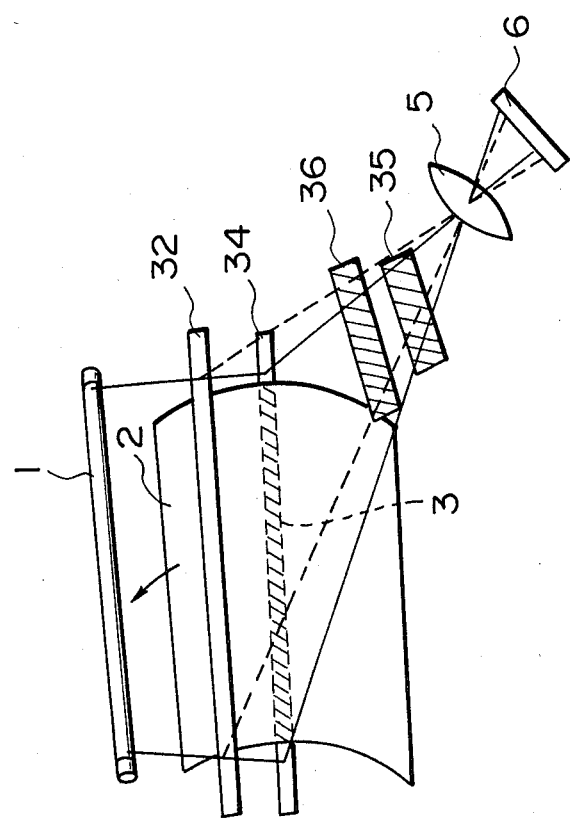

Although the reference reflective plates are movably mounted in the previously mentioned embodiments of the present invention, the present invention may similarly be applied to the following modifications in each of which a reference reflective plate is maintained stationary as shown in FIG. 5 or 6. The embodiments shown in FIGS. 5 and 6 also can utilize the same control system as that previously described with reference to FIGS. 2 and 3.

Referring to FIG. 5, there is shown a reference reflective plate 32 which is stationarily disposed at a position spaced away from the document reading position 3 by a small distance. The reflective plate 32 is positioned in front of the document and thus will not be hidden from the lamp 1 by the document 2. The lamp 1 is adapted to irradiate the part of the document placed at the reading position 3 and the reflective plate 32 simultaneously.

There is provided a mirror 33 which is supported pivotably about a shaft 33'. The mirror 33 is connected with the electromagnetic plunger 13 and the tension spring 14. When the plunger 13 is energized, the mirror 33 is moved to a position A to form an optical path directing the reference light from the reflective plate 32 to the image sensor 6 through the lens 5. On the other hand, when the plunger 13 is de-energized, the mirror 33 is moved to a position B under the action of the spring 14 to form another optical path for imaging the part of the document placed at the reading position 3 on the image sensor 6 through the lens 5. In other words, as the plunger 13 shown in FIG. 1, the plunger 13 shown in FIG. 5 is energized in the reference light reading mode in which the image sensor 6 is irradiated by the reference light to form a reference shading signal to be stored in the memory 19, and de-energized in the document reading mode in which the image of the document is projected onto the image sensor 6 to form a document image signal.

FIG. 6 shows still another embodiment of the present invention which comprises a shutter 35 located in the optical path between the part of the document placed in the document reading position 3 and the image sensor 6 and another shutter 36 disposed between in the optical path between the reference reflective plate 32 and the image sensor 6. In the reference light reading mode, the shutter 36 is opened while the shutter 35 is closed. Thus, the reference light may be projected onto the image sensor 6. In the document reading mode, the shutter 35 is opened while the shutter 36 is closed. As a result, the image of the document may be projected onto the image sensor 6. In other words, the signal used to energize the plunger 13 as in the embodiments shown in FIGS. 1 and 5 is utilized to open the shutter 36 and close the shutter 35 while the signal used to de-energize the same plunger 13 is utilized to close the shutter 36 and open the shutter 35.

In the embodiment shown in FIG. 6, it is difficult that all the very thin photoelectric conversion element line in the image sensor 6, the part of the document placed at the document reading position 3 and the reflective plate 32 are optically accurately located to be conjugate with one another. If the lens 5 is so arranged that the part of the document place at the reading position 3 becomes optically accurately conjugate with the photoelectric conversion element line of the sensor 6, the reflective plate 32 and the photoelectric conversion element line of the sensor 6 will be out of the optically conjugate relationship. It is therefore desirable that the reflective 32 is disposed at such a position as is adjacent to the reading position 3 and in which the image placed in its de-focus state can be projected onto the photoelectric conversion element line of the sensor 6 thorugh the lens 5.

The shutters 35 and 36 may be actuated in either of mechanical, electro-optic or other manner. Also, a single shutter may alternately be inserted into said two optical paths.

For simplification of description, FIGS. 5 and 6 do not show such means 7, 8, 9, 10, 17, 23, 24, 25 and 26 as shown in FIG. 1.

In FIGS. 5 and 6, reference numeral 34 denotes a reflective plate fixedly held at the document reading position 3. This reflective plate 34 is completely hidden from the lamp 1 and sensor 6 by the document 2 except the opposite ends of the plate when the document 2 reaches the position 3. The sensor 6 generates its outputs corresponding to the reflected light from the opposite ends of the reflective plate 34, which outputs are in turn utilized to correct the gain in the output of the sensor 6 corresponding to the document image.

Step B in FIG. 3 may be executed by utilizing the light reflected from the reflective plate 34 as a reference light. In such a case, at Step B, the plunger 13 is de-energized or the shutter 35 is opened while the shutter 36 is closed. In the embodiments shown in FIGS. 1 and 4, a reflective plate similar to the reflective plate 34 shown in FIGS. 5 and 6 may be disposed in the position 3 and at Step B, the light reflected from the reflective plate 34 may be utilized as a reference light to form a reference shading signal. In this case, the plunger 13 shown in FIG. 1 or the solenoid 10 shown in FIG. 4 is de-energized at Step B.

Although the previously mentioned embodiments of the present invention have been described to move the document relative to the stationary lamp 1, the document may be placed on a stationary platen and the lamp may be moved to scan the stationary document.

Furthermore, the analog memory 19 may be replaced by memory means for causing the output of the sensor 6 to convert into a digital signal through an A/D converter, causing this digital signal to store in a digital memory, and causing the output of the digital memory to re-convert into an analog signal through a D/A converter.

What is claimed is:

1. A document reading apparatus comprising:
    illumination means;
    drive means for moving the document relative to said illumination means;
    image pick-up means for converting the image of said document irradiated by said illumination means into an electric signal;
    reference means irradiated by said illumination means to form a reference light to be applied to said image pick-up means;
    memory means for storing information with respect to the distribution of the degree of light intensity of said reference light on said image pick-up means;
    correction means for correcting the electric signal of the document image from said image pick-up means in accordance with the output of said memory means; and
    control means for changing said document reading apparatus from a mode in which the document image is projected onto said image pick-up means to a mode in which said reference light is projected onto said image pick-up means at a predetermined point of time even if during the time at which the document image is still in position for being projected onto said image pick-up means.

2. A document reading apparatus according to claim 1, wherein said predetermined point of time is between when the information with respect to the distribution of light is stored in said memory means and when a predetermined time period has elapsed and wherein said control means includes timer means for measuring said predetermined time period.

3. A document reading apparatus according to claim 1, wherein said predetermined point of time is when the document is moved relative to said illumination means a predetermined distance by said drive means and wherein said control means includes means for measuring the movement of said drive means.

4. A document reading apparatus according to claim 1, wherein said predetermined point of time is when the distribution of luminous strength in said illumination means is changed exceeding a predetermined value and wherein said control means includes means for detecting information with said distribution of luminous strength in said illumination means.

5. A document reading apparatus according to any one of claims 1 through 4 wherein said control means is adapted to stop said drive means in the mode in which the reference light from said reference means is projected onto said image pick-up means.

6. A document reading apparatus according to claim 5 wherein said reference means is movable and wherein said control means is adapted to move said reference means into the optical path between the document and said image pick-up means in the mode in which the reference light is projected onto said image pick-up means and adapted to retract said reference means from said optical path in the mode in which the document image is projected onto said image pick-up means.

7. A document reading apparatus according to claim 5, further comprising a mirror movable between a first position in which an optical path is formed from the document to said image pick-up means and a second position in which an optical path from said reference means to said image pick-up means is formed and wherein said control means causes said mirror to move to said first position in the mode in which the document image is projected onto said image pick-up means and to move to said second position in the mode in which the reference light is projected onto said image pick-up means.

8. A document reading apparatus according to claim 5, further comprising a first shutter means located in the optical path between the document and said image pick-up means and a second shutter means disposed in the optical path between said reference means and said image pick-up means and wherein said control means is adapted to open said first shutter means in the mode in which the document image is projected onto said image pick-up means and to open said second shutter means in the mode in which the reference light is projected onto said image pick-up means.

* * * * *